United States Patent [19]

Frink

[11] Patent Number: 4,903,974
[45] Date of Patent: Feb. 27, 1990

[54] OFF-THE-ROAD-VEHICLE

[75] Inventor: Dennis M. Frink, Lidcombe, Australia

[73] Assignee: JAC Tractor Limited, Sydney, Australia

[21] Appl. No.: 112,176

[22] Filed: Oct. 26, 1987

Related U.S. Application Data

[63] Continuation-in-part of Ser. No. 893,247, Aug. 5, 1986, abandoned.

[51] Int. Cl.$^4$ .................... B60K 17/358; B60K 17/34
[52] U.S. Cl. .................................... 180/253; 180/265; 180/900; 280/104
[58] Field of Search ................ 280/104; 180/237, 238, 180/245, 246, 240, 253, 73.2, 53.7, 900, 265

[56] References Cited

U.S. PATENT DOCUMENTS

| | | | |
|---|---|---|---|
| 812,037 | 2/1906 | Hanson et al. | |
| 1,071,498 | 8/1913 | Babcock | 280/104 |
| 1,437,911 | 12/1922 | Rawson | 280/104 |
| 1,627,654 | 5/1927 | Lewis | 180/53.7 X |
| 2,994,392 | 8/1961 | Kosman | 180/6.24 |
| 3,053,547 | 9/1962 | Osborne | 280/112 |
| 3,266,815 | 8/1966 | Bishop et al. | 280/104 |
| 3,338,327 | 8/1967 | Bishop | 280/104 X |
| 3,366,398 | 1/1968 | Mulholland | 280/103 |
| 3,504,928 | 4/1970 | Reiner | 280/104 |
| 4,566,553 | 1/1986 | McCutcheon | 180/237 |
| 4,632,194 | 12/1986 | Averill et al. | 280/104 X |

FOREIGN PATENT DOCUMENTS

| | | | |
|---|---|---|---|
| 2430344 | 3/1980 | France | 280/104 |
| 322739 | 1/1930 | United Kingdom . | |
| 770667 | 3/1957 | United Kingdom . | |

Primary Examiner—Charles A. Marmor
Assistant Examiner—T. Finlay
Attorney, Agent, or Firm—Beveridge, DeGrandi & Weilacher

[57] ABSTRACT

A vehicle suitable for various uses in rough terrain. The vehicle has a platform or chassis (11) suspended within a flexible frame (14). The wheels (17, 18) are mounted at opposite ends of side members (23, 24) of the flexible frame (14). The platform connects to the neutral midpoints of the frame rails so as to minimize the movement of the platform or chassis out of the horizontal plane. Rotating drive shafts may enter or pass through hollow pivot pins at the midpoints of the members of the frame (14) thereby remaining on the same plane with one another and isolated from flexing from the frame. The platform may serve as a mounting for a seat (16) of the vehicle. It may also be utilized as a support for the engine (15) of the vehicle.

20 Claims, 5 Drawing Sheets

OFF-THE-ROAD-VEHICLE

REFERENCE TO RELATED APPLICATION

This is a continuation-in-part of U.S. patent application Ser. No. 893,247 filed Aug. 5, 1986, for an Off-The-Road-Vehicle, now abandoned.

FIELD OF INVENTION

This invention relates to vehicles including vehicles suitable for various uses in rough terrain.

BACKGROUND ART

The advantage of raising a vehicle on tubular leg posts for row crop cultivation is taught by Thomsen U.S. Pat. No. 2,749,137 and of combining steering and drive mechanisms in such tubular leg posts is taught by Kosman U.S. Pat. No. 2,994,392. In addition, a means of partially isolating a vehicle from torsional stresses resulting from uneven terrain is taught by Bishop U.S. Pat. No. 3,266,815. Further examples of the prior art are U.S. Pat. No. 3,366,398 (Mulholland); U.S. Pat. No. 4,566,553 (McCutcheon) and U.S. Pat. No. 812,037 (Hanson).

The vehicles of the prior art have suffered from a number of disadvantages. For example, the frames of U.S. Pat. Nos. 3,266,815 and 3,366,398 support platforms which are substantially elevated above the frame so that the vehicles are not inherently stable. Furthermore, those prior art machines which are self-propelled generally have rigid support frames and an overly complicated drive arrangement.

DISCLOSURE OF INVENTION

According to one aspect of the invention there is provided a vehicle comprising:
(i) a flexible frame having a pair of side members and a pair of end members,
(ii) connector means at each corner of said frame, each said connector means including a pivotal connection between the connector means and the end of the side member and the end of the end member at the respective corners whereby each side member and each end member may pivot relative to the connector means to which they are connected,
(iii) a front wheel at one end of each side member and a rear wheel at the other end of each side member,
(iv) a platform within the said flexible frame and connected thereto by front and rear pivot means which extend from the platform to the end members and by side pivot means which extend from the platform to each side member whereby said end members and said side members may pivot about the respective pivot means.

According to another aspect of the invention there is provided a machine comprising:
(i) a flexible frame having a pair of side members and a pair of end members,
(ii) connector means at each corner of said frame, each said connector means including a pivotal connection between the connector means and the end of the side member and the end of the end member at the respective corners whereby each side member and each end member may pivot relative to the connector means to which they are connected,
(iii) a platform within the said flexible frame and connected thereto by front and rear pivot means which extend from the platform to the end members and by side pivot means which extend from the platform to each side member whereby said end members and said side members may pivot about the respective side pivot means, at least one of said pivot means being hollow, and,
(iv) drive means mounted on the platform and extending into the hollow pivot means.

BRIEF DESCRIPTION OF THE DRAWINGS

In order that the invention may be more readily understood and put into practical effect, reference will now be made to the following drawings in which.

DESCRIPTION OF PREFERRED EMBODIMENTS

Figure 1:
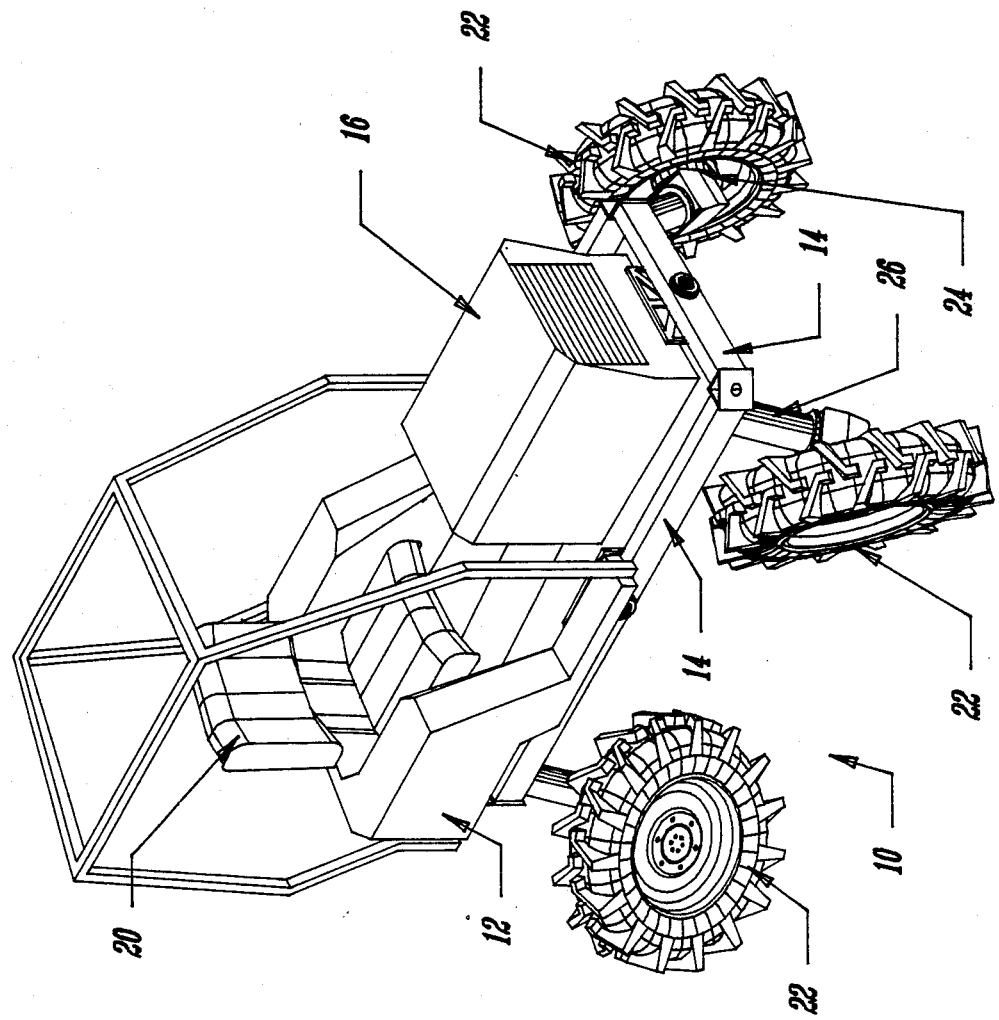
FIG. 1 is a perspective view of a vehicle according to one embodiment of the invention.

The vehicle 10 shown in FIG. 1 comprises a body 12 supported on a platform or chassis 11 which is within a flexible frame 14 which will be described in detail below in relation to FIGS. 2 and 3. The vehicle 10 is powered by a conventional engine 15 mounted on the platform 11. A seat is secured to the platform 11.

The vehicle 10 is supported by front wheels 17 and rear wheels 18 each of which is driven by a powered suspension system serving not only to drive the wheel but also to cause the wheel to pivot up and down in response to irregularities in the terrain thereby maintaining four wheel contact with the ground even when one wheel is driving over an obstacle while another is dropping into a depression.

Each wheel 17, 18 has a final drive assembly 19 positioned at the lower end of a tubular leg post 20 that extends downwardly and outwardly from the frame 14.

Figure 2:
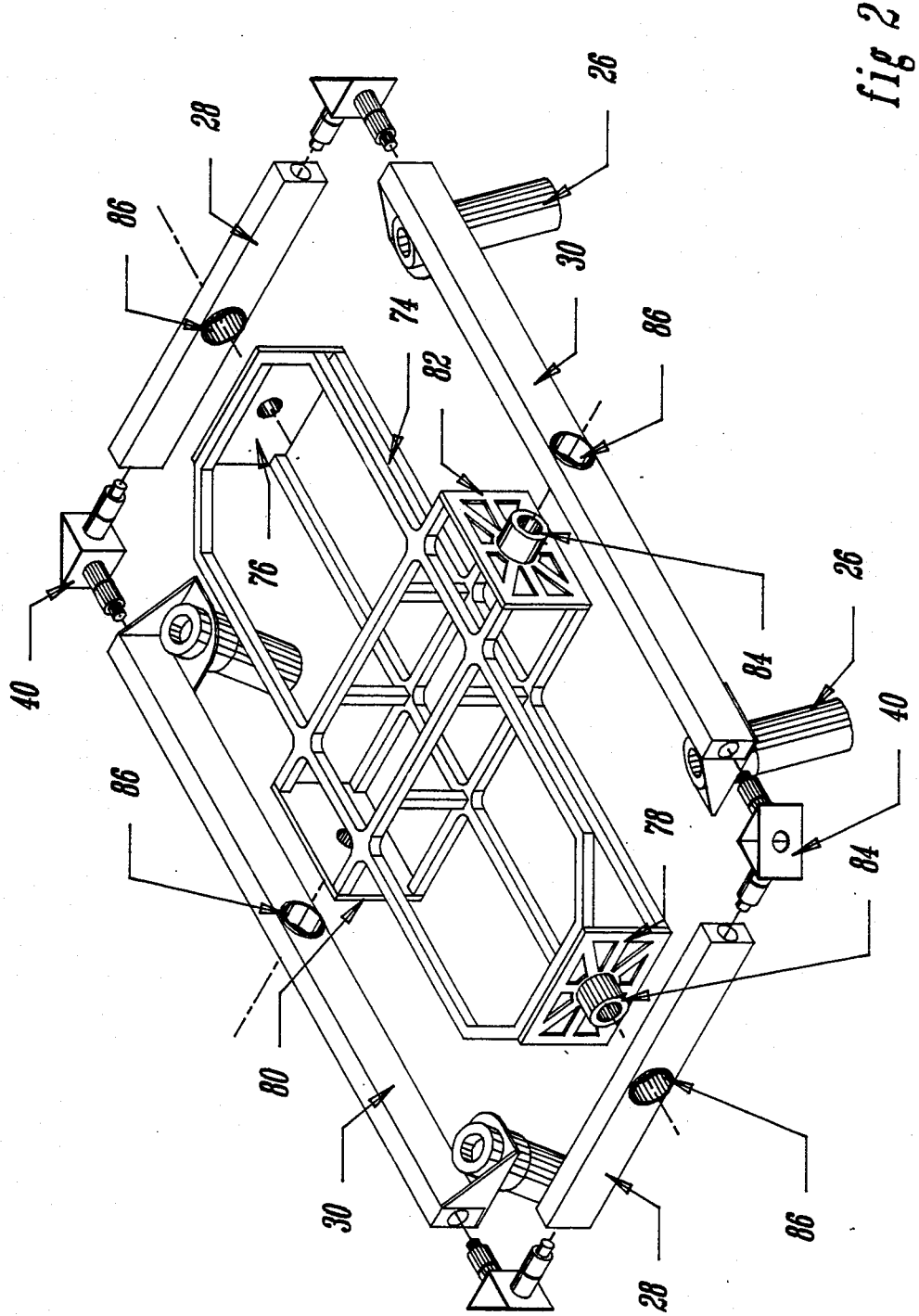
FIG. 2 is a perspective view of the main frame of the vehicle shown in FIG. 1 with the frame in its neutral position.
Figure 3:
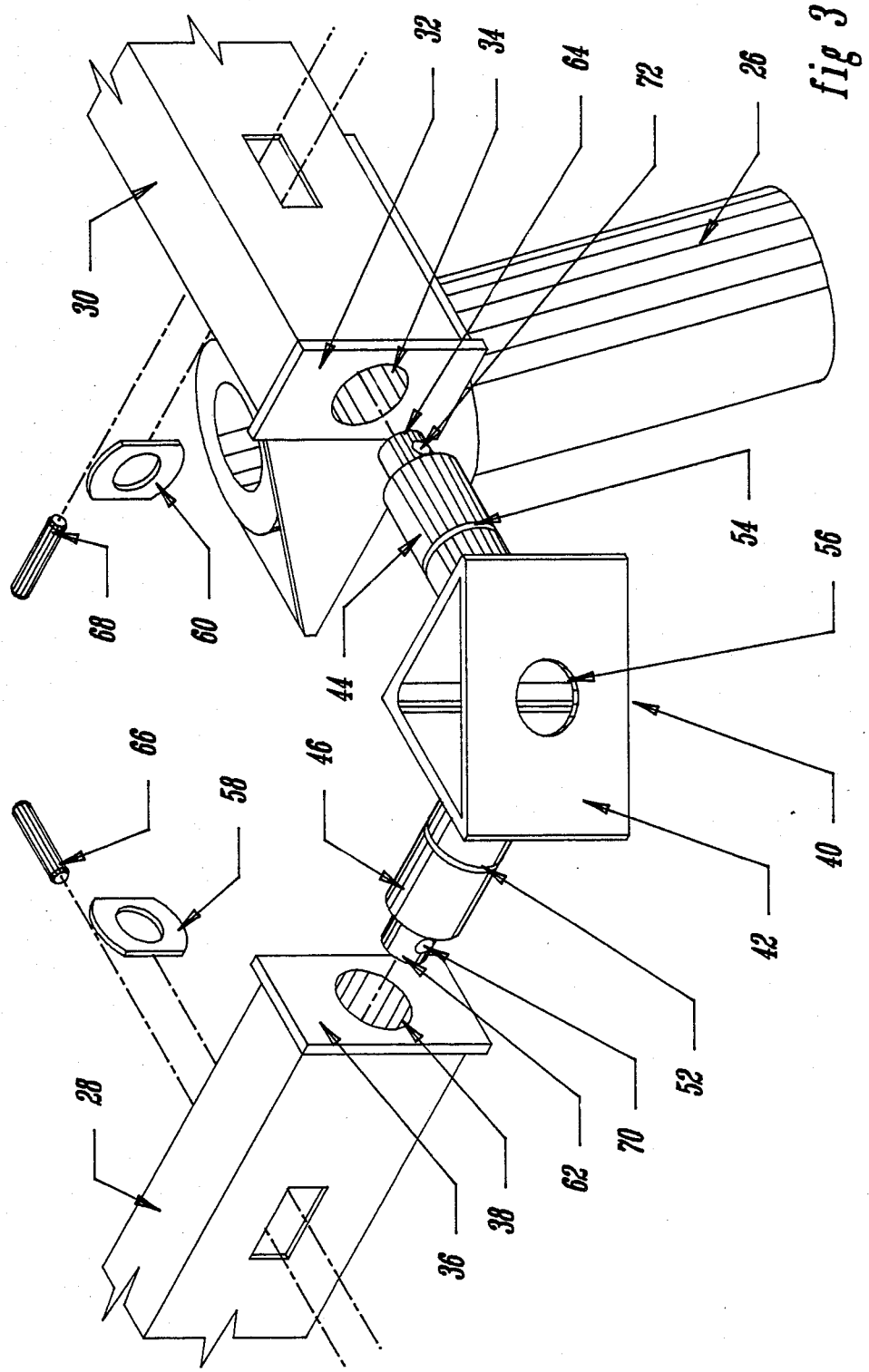
FIG. 3 is a view similar to FIG. 2 but with the main frame flexed.

As can be seen in FIGS. 2 and 3, the flexible frame 14 consists of a pair of end members 21 and 22 and a pair of side members 23 and 24 connected together by connectors 25, to define, in this instance, a rectangular shape. The end members 21, 22 and side members 23, 24 are connected in a manner so that they may pivot or oscillate relative to the platform.

The details of the connections of the adjacent ends of the end members and side members is identical so it will suffice to describe only one corner connection. Each connector 25 consists of an arcuate shaped member 26 having a pair of pins 27 and 28 retained respectively within the ends of adjacent frame members. The pins 27 and 28 are maintained in bushings (not shown) within the ends of the frame members in such a manner that they may pivot or oscillate relative to the bushings. If desired, the pins may also move linearly within the bushings.

The platform 11 consists of an open framework having end members 30 and 31 and side members 32 and 33. Each of the end members 30 and 31 is provided with a hollow pin 34 rigidly secured thereto. The hollow pins 34 are slidably received in bushings 35 provided at the center of the end members 21, 22 of the flexible frame 14. The hollow pins 34 are permitted to slide as well as pivot within the bushings 35. Details of the pivotal connection of the platform 11 to the side members of the frame 14 will be described below in relation to FIG. 4. However, it is to be noted that the platform is connected to the neutral mid points of the frame members so as to minimize movement of the platform out of the horizontal plane.

From the foregoing description, it will be readily apparent that when the vehicle 10 encounters uneven terrain, the frame 14 will be flexed, however, the platform 11 will remain substantially in the same horizontal plane as if no flexing of the frame 14 had occurred. This action is best illustrated in FIG. 2 where the frame is in its neutral position and in FIG. 3 where the frame is flexed.

As can be seen in FIG. 3, one pair of diagonally opposed corners of the flexible frame 14 will be raised or lowered together while the other pair of diagonally opposed corners will be lowered or raised together (i.e. the second pair of corners will move in the opposite direction to the first pair of corners.

Since the platform 11 supports the engine 15 and drive train components, the stability of the platform 11 reduces strain on the engine and drive train components.

In this embodiment of the invention, the wheels 17, 18 are all driven and are all steerable so that the vehicle is able to traverse very rough terrain. However, for the sake of simplicity the steering mechanism is not shown in the drawings.

The platform 11 supports a transmission box 40 connected in any convenient way to the engine 15. The transmission box 40 has opposed outwardly extending drive shafts located within tubular housing 41, 42 that connect the side members 32, 33 of the platform 11 to the side members 24, 23 of the flexible frame 14.

Figure 4:
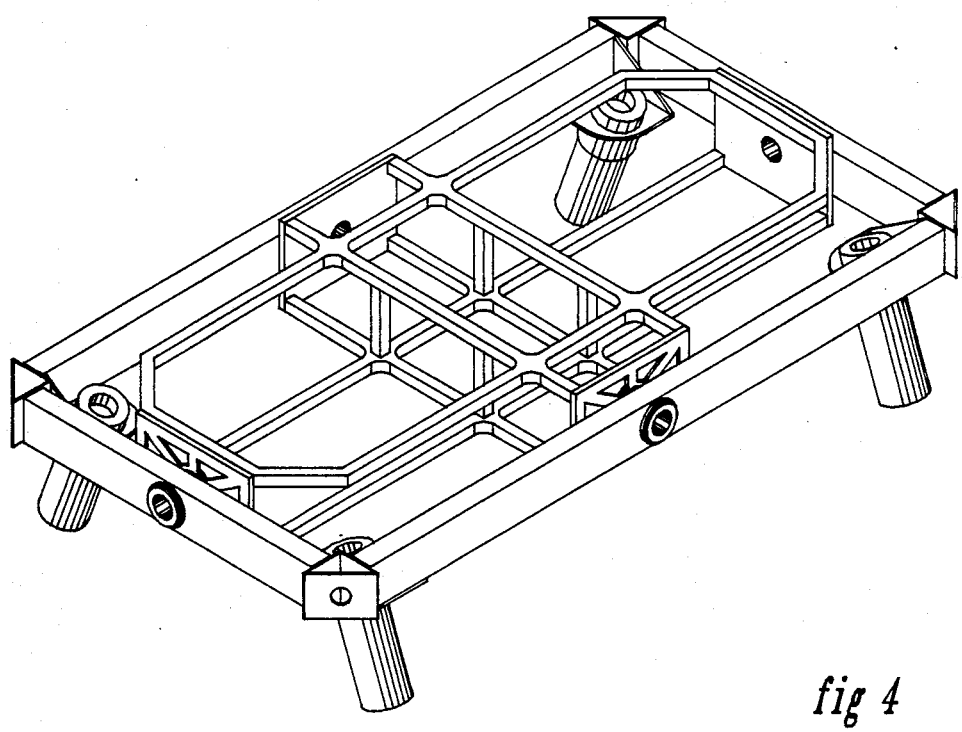
FIG. 4 is a partly cut away, perspective view showing the drive connection to the flexible frame.

As can be seen in FIG. 4, the tubular housing 42 has an end flange 43 by means of which the housing 42 is bolted to transmission box 40. The flange 43 carries a bearing 44 which supports a drive shaft 45 that extends from the transmission box 40 to transfer box 46 which forms part of the side member 23 of the flexible frame 14. At the outer end of the drive shaft 45 there is a bevel gear 47.

The outer end of the tubular housing 42 is supported by and rotatable within a flange 48 bolted to the transfer box 46. The outer end of the tubular housing 42 carries a bearing 49 which supports the drive shaft 45. A similar arrangement is provided in respect of the tubular housing 41.

The side member 23 of the flexible frame 14 includes two tubular housings 50, 51 which extend fore and aft from the transfer box 46 to front and rear housings 52, 53 respectively. As can be seen in FIG. 2, each housing 52, 53 has an offset portion 54 which carries the bushing (not shown) for the pin 28 of the connector 25. The housing 51 is supported by flanged support 55 on the transfer box 46 and a flanged support 56 on the front housing 52. Housing 50 is supported in a similar way by flanged supports 57, 58.

Figure 5:
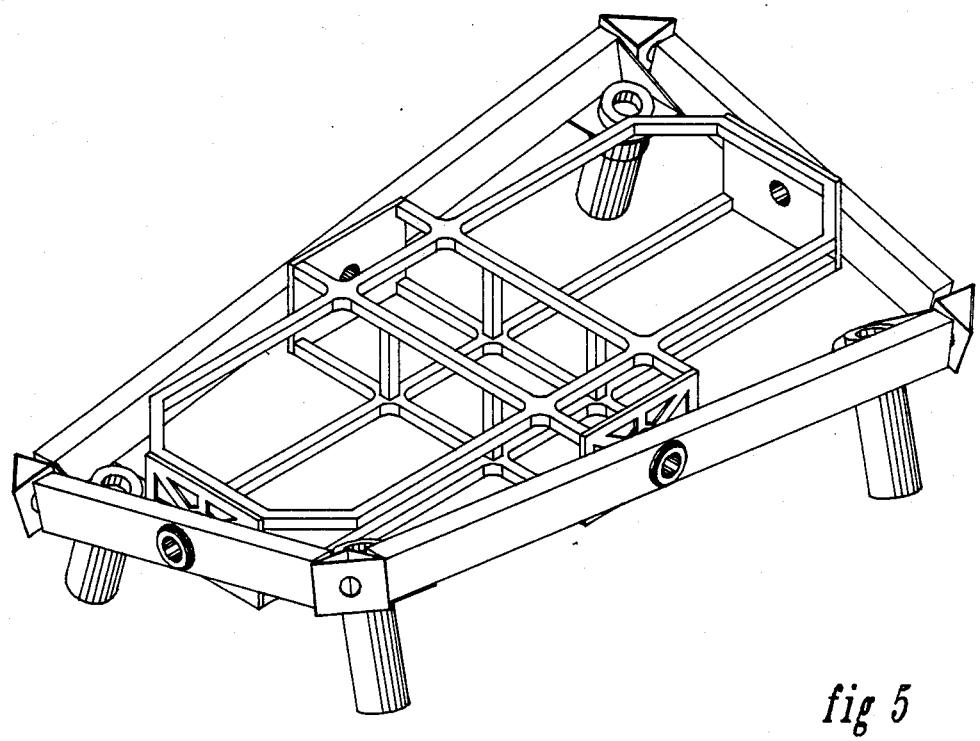
FIG. 5 is a partly cut away, perspective view showing the drive connection from the frame to the leg post and the connection at the corner of the frame, and, FIG. 6 is an exploded view of the final drive assembly at one of the wheels of the vehicle shown in FIG. 1.

The flanged support 55 carries a bearing 59 that supports one end of drive shaft 60 (FIG. 4) and flanged support 56 carries a bearing 61 that supports the other end of the drive shaft 60 (FIG. 5). The drive shaft 60 has a bevel gear 62 enmeshed with bevel gear 47 and a bevel gear 63 that drives bevel gear 64 with front housing 52. It should be noted that whereas FIG. 4 shows the transfer box 46 on the far side of the vehicle, FIG. 5 shows the housing on the near side of the vehicle as shown in FIG. 1.

The front housing 52 carries a bearing 65 that supports drive shaft 66 having the bevel gear 64 at its upper end. The drive shaft 66 extends into the final drive assembly box 19 mounted at the end of tubular post 20 by means of the flanged support 67. The post 20 is rotatable with respect to the front housing 52 by means of bearing 68. A similar arrangement is provided for each housing 52, 53.

Figure 6:
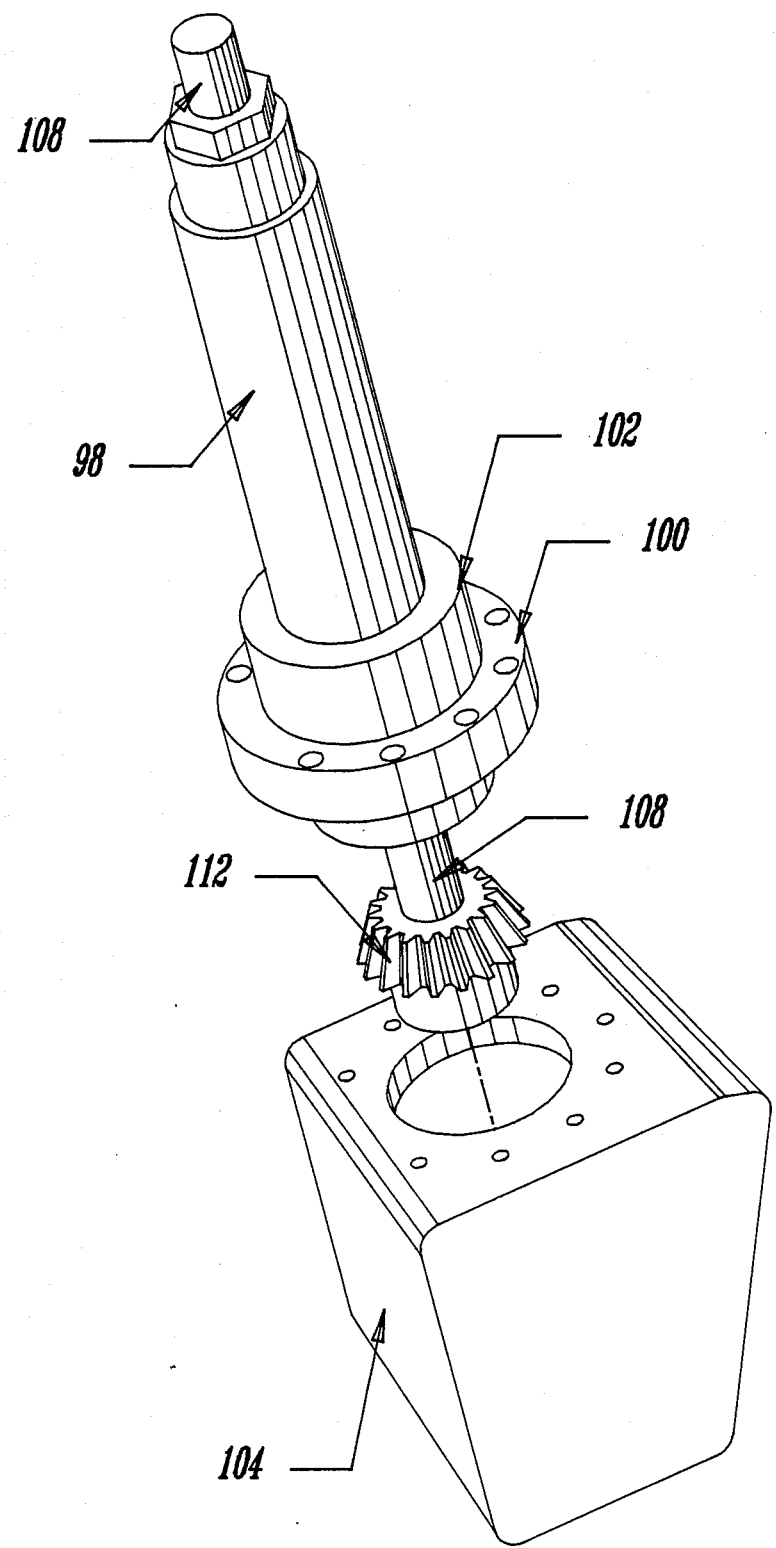

The final drive to each wheel is shown in FIG. 6. A bevel gear (not shown) is secured to the lower end of the drive shaft 66 which extends into final drive box 19. A swivel assembly 70 is secured to a face of the box 19. The swivel assembly 70 includes a casing 71 having a flange 72 thereon which is bolted to the box 19.

Rotatably mounted in the casing 71 is a bevel gear 73 which extends into the box 19 and mates with the bevel gear on the shaft 66 to be driven thereby. The bevel gear 73 is mounted on a shaft 74 which extends through the casing 71 and is provided with a pinion gear 75 formed thereon.

A gear box 76 is provided with a hub 77 mounted on a stub shaft (not shown) which is rotatably supported in the gear box 76. The hub 77 is secured to the stub shaft (not shown) and has a plurality of threaded studs 78 for securing a wheel thereto. A bull gear (not shown) is mounted on the stub shaft within the gear box 76 and engages the pinion gear 75 through the arcuate opening 79 to be driven thereby which in turn rotates hub 77.

The gear box 76 is secured to the swivel assembly 70 by retainer ring 80 which rests on a ledge 81 surrounding the opening 82 in the gear box 76. The retainer ring 80 is bolted to the swivel assembly 70 and is provided with a bearing 83 to support the end of the shaft 74. In this manner the gear box 76 is free to pivot somewhat relative to the swivel assembly. The stop bars 84 limit the amount of movement of the gear box 76 by engaging pockets formed with the bore (not shown) of the gear box 76.

An unique arrangement of this portion of the drive train is that upon initiating drive motion to the wheels of the vehicle, the frictional resistance between the wheels and the ground will result in gear 124 riding up on the bull gear causing the gear box to pivot downwardly thus raising the frame upwardly from the ground.

Although the invention has been described in relation to a particular embodiment in which each wheel is driven and steered, it is to be understood that the invention is not limited thereto. For example, the flexible frame and platform arrangement may be used with non-driven wheels to provide a non self-propelled device such as a trailer.

Furthermore, the pivotal connections between the side members 32, 33 of the platform and the side members 24, 23 of the flexible frame need only be hollow when it is required to provide drive means from the platform 11 to wheels 17 carried by the frame 14. Similarly, the pivotal connections between the end members 30, 31 of the platform 11 and the side members 22, 21 of the flexible frame 14 need only to be hollow when it is required to provide drive means from the platform 11 through the or each pivotal connection such as power take off shaft from the transmission box 40.

As indicated above, the frame 14 flexes when the wheels traverse uneven terrain. The resultant stresses are taken up by bending of the frame members and corner connections and the clearance of the corner connector pins in their bushes at the end of the beams. In one embodiment of the invention, one wheel can be lifted 20 inches before a second wheel lifts from the ground. Under this flexure of the frame, the rotation of the corner connector pin in its bush was approximately 30 degrees and there was also sliding of the pins within their bushes.

The mounting of the wheels 17, 18 at the ends of the side members 23, 24 of the flexible frame 14 and the provision of drive shafts within the side members 23, 24 means that the side members 23, 24 become, in effect, longitudinal axles of the vehicle as opposed to the transverse axles of conventional vehicles.

The drive shafts enter or pass through the hollow pivot pins at the midpoints of the frame members whereby they remain on the same plane with one another and are isolated from flexing of the frame.

If the vehicle is to be used to push or pull agricultural implements, logs, trailers and other objects, a draft connection may be made to the platform. This would be desirable since the draft means would not be subjected to the movement of the flexing frame as the vehicle moves over the uneven terrain. This arrangement minimizes failure from material fatigue and abrasion between elements of the draft means.

Various modifications may be made in details of design and construction without departing from the scope and ambit of the invention. For example, the corner connectors may be replaced by a pin extending from one end of an end member of the frame and a connector piece having an aperture to receive that pin, the connector piece being connected to the side member by a pin and bushing arrangement as before. In addition, retaining means may be provided on the end and side members of the frame to maintain the relative rectangular orientation of the side members and end members.

I claim:
1. A vehicle comprising:
   (i) a flexible frame having a pair of side members and a pair of end members,
   (ii) connector means at each corner of said frame, each said connector means including a pivotal connection between the connector means and the end of the side member and the end of the end member at the respective corners whereby each side member and each end member may pivot relative to the connector means to which they are connected, said connector means accommodating increased distances which occur between the ends of the side members and the ends of the end members during operation of the vehicle,
   (iii) a front wheel at one end of each side member and a rear wheel at the other end of each side member,
   (iv) a platform within the said flexible frame and connected thereto by front and rear pivot means which extend from the platform to the end members and by side pivot means which extend from the platform to each side member whereby said end members and said side members may pivot relative to the respective pivot means,
   (v) said wheels being connected to the side members at locations between the side pivot means and the pivotal connection means so that the wheels do not tilt laterally when the end members pivot on said front and rear pivot means.
2. A vehicle according to claim 1 and including means for driving at least two of the wheels.
3. A vehicle according to claim 2 wherein each driven wheel is mounted on a downwardly extending hollow leg support.
4. A vehicle according to claim 3 wherein the drive means passes through the hollow leg support to the driven wheel.
5. A vehicle according to claim 4 wherein the hollow leg supports are inclined outwardly from the side members.
6. A vehicle according to claim 1 wherein said members have mid points and the platform is connected to the mid points of the side members and end members of the flexible frame.
7. A machine comprising:
   (i) a flexible frame having a pair of side members and a pair of end members,
   (ii) connector means at each corner of said frame, each said connector means including a pivotal connection between the connector means and the end of the side member and the end of the end member at the respective corners whereby each side member and each end member may pivot relative to the connector means to which they are connected, said connector means accommodating increased distances which occur between the ends of the side members and the ends of the end members during operation of the vehicle,
   (iii) a platform within the said flexible frame and connected thereto by front and rear pivot means which extend from the platform to the end members and by side pivot means which extend from the platform to each side member whereby said end members and said side members may pivot relative to the respective pivot means, at least one of said pivot means being hollow,
   (iv) drive means mounted on the platform and extending into the hollow pivot means,
   (v) said machine having wheels which are connected to the side members at locations between the side pivot means and the connection means so that the wheels do not tilt laterally when the end members pivot on said front and rear pivot means.
8. A machine according to claim 7 wherein at least one of the front and rear pivot means are hollow and wherein a power take off shaft extends from the drive means and through at least one of the the hollow pivot means.
9. A machine according to claim 8 wherein said members have mid points and the pivot means are connected to the mid points of the respective side members and end members.
10. A machine according to claim 9 having a front to rear axis and a side to side axis wherein the pivot means extend along the respective front to rear and side to side axes of the platform.
11. A machine according to claim 7 and including a pair of front wheels and a pair of rear wheels supporting the flexible frame, at least two of said wheels being adapted to be driven, and wherein the side pivot means are hollow and the drive means extends from the platform and into the hollow side pivot means.

12. A machine according to claim 7 wherein the drive means extends from the hollow pivot means to at least one end of at least one of the members of the frame.

13. A vehicle according to claim 1 wherein said connector means permit linear movement between the side members and the end members at each corner of the frame.

14. A vehicle according to claim 2 wherein the means for driving the wheels includes a first driving member which is supported on the platform,
   said first driving member being rotatable about a first axis which is fixed relative to the platform and is concentric with one of the side pivot means,
   a second driving member which is mounted on a said side member and is rotatable about a second axis which is spaced from the first axis and is fixed relative to said side member,
   means for drivingly connected the first driving member to the second driving member to transmit rotary motion from the first driving member to the second driving member, and
   means for drivingly connecting the second driving member to one of said wheels.

15. A vehicle according to claim 14 wherein said first axis is generally horizontal and said second axis is generally vertical and inclined outwardly.

16. A machine according to claim 7 wherein said connector means permit linear movement between the side members and the end members at each corner of the frame.

17. A machine according to claim 7 wherein said members have mid points and the side pivot means are connected to the mid points of the respective side members and the front and rear pivot means are connected to the mid points of the respective end members.

18. A machine according to claim 17 having a front to rear axis and a side to side axis, wherein the pivot means extend along the respective front to rear and side to side axes of the platform.

19. A vehicle comprising:
   (i) a flexible frame having a pair of side members and a pair of end members,
   (ii) connector means at each corner of said frame for pivotally connecting a side member to an end member at the respective corner whereby each side member and each end member may pivot relative to each other at the corner, said connector means accommodating increased distances which occur between the ends of the side members and the ends of the end members during operation of the vehicle,
   (iii) four wheels mounted on said flexible frame,
   (iv) a platform within the said flexible frame and connected thereto by front and rear pivot means which extend from the platform to the end member and by side pivot which extend from the platform to each side member whereby said end members and said side members may pivot relative to the respective pivot means, and
   (v) said wheels being connected to the side members at locations between the side pivot means and the pivotal connection means so that the wheels do not tilt laterally when the end members pivot on said front and rear pivot means,
   (vi) wheels driving means including a first driving member which is supported on the platform and is rotatable about a first axis which is fixed relative to the platform, a second driving member which is mounted on the flexible frame and is rotatable about a second axis which is spaced from the first axis, means for drivingly connecting the first driving member to the second driving member to transmit rotary motion from the first driving member to the second driving member, and means for connecting the second driving member to one of said wheels, said first axis being concentric with one of said pivot means.

20. A vehicle according to claim 19 wherein said connector means permit linear movement between the side members and the end members at each corner of the frame.

* * * * *